US008963772B2

(12) United States Patent
Xu et al.

(10) Patent No.: US 8,963,772 B2
(45) Date of Patent: Feb. 24, 2015

(54) METHOD AND SYSTEM FOR ACQUIRING EPHEMERIS INFORMATION

(75) Inventors: Jun Xu, Clarksburg, MD (US); Yash Vasavada, Gaithersburg, MD (US); Mike Parr, Del Mar, CA (US); Channasandra Ravishankar, Germantown, MD (US); Anthony Noerpel, Lovettsville, VA (US); Je-Hong Jong, North Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 426 days.

(21) Appl. No.: 13/326,209

(22) Filed: Dec. 14, 2011

(65) Prior Publication Data

US 2012/0146849 A1  Jun. 14, 2012

Related U.S. Application Data

(60) Provisional application No. 61/422,700, filed on Dec. 14, 2010.

(51) Int. Cl.
| | |
|---|---|
| *G01S 19/27* | (2010.01) |
| *G01S 19/12* | (2010.01) |
| *G01S 19/05* | (2010.01) |
| *G01S 19/25* | (2010.01) |
| *G01S 19/33* | (2010.01) |

(52) U.S. Cl.
CPC ............... *G01S 19/05* (2013.01); *G01S 19/258* (2013.01); *G01S 19/27* (2013.01); *G01S 19/33* (2013.01)
USPC .................................. 342/357.66; 342/357.49

(58) Field of Classification Search
CPC ....... G01S 19/27; G01S 19/258; G01S 5/0263
USPC ............... 342/357.4, 357.49, 357.64, 357.66; 701/468, 470
See application file for complete search history.

(56) References Cited

U.S. PATENT DOCUMENTS

| | | | |
|---|---|---|---|
| 2003/0011511 A1* | 1/2003 | King et al. ............... | 342/357.02 |
| 2006/0290566 A1* | 12/2006 | Syrjarinne et al. ....... | 342/357.15 |

\* cited by examiner

*Primary Examiner* — Dao Phan
(74) *Attorney, Agent, or Firm* — Potomac Technology Law, LLC

(57) ABSTRACT

An approach provides for conversion of global positioning system (GPS) data. A user terminal receives positioning data from a base station, wherein the positioning data is received in a second format, and wherein the second format was derived from ephemeris data broadcast via a global positioning system (GPS) in a first format. The user terminal converts the positioning data from the second format into a third format that is compatible with a protocol of the GPS system, and determines a first fix using the third format of the positioning data.

18 Claims, 13 Drawing Sheets

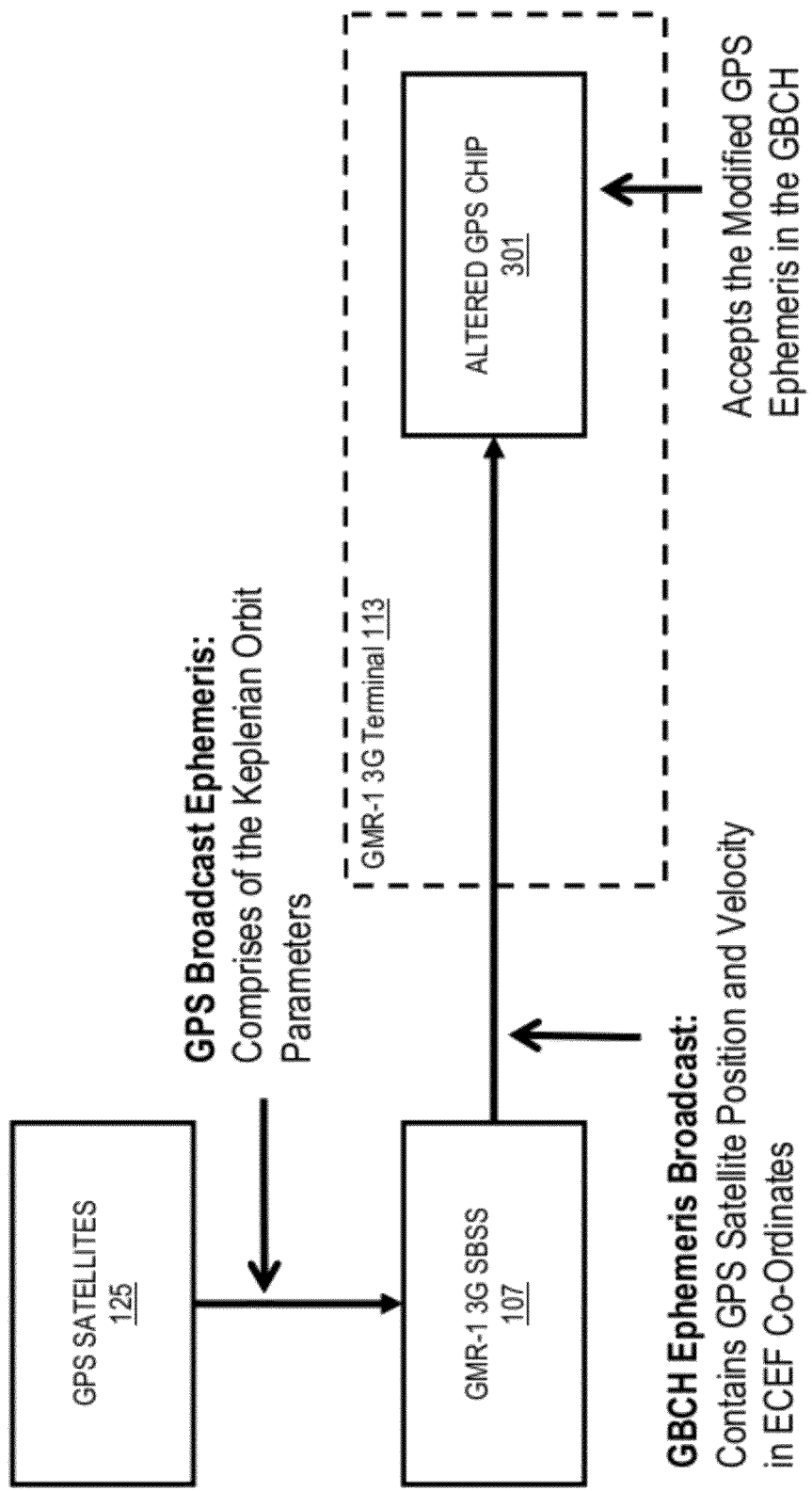

METHOD AND SYSTEM FOR ACQUIRING EPHEMERIS INFORMATION

RELATED APPLICATIONS

This application is related to and claims the benefit of priority under 35 U.S.C. §119(e) to U.S. Provisional Application Ser. No. 61/422,700 filed Dec. 14, 2010, the entirety of which is incorporated herein by reference.

BACKGROUND

In recent years, Global Navigation Satellite System (GNSS) satellites are utilized to provide user terminals with data regarding their respective locations. Global Positioning System (GPS) is one of the more recognized examples of a GNSS that consists of a network of satellites. GNSS satellites broadcast their own ephemeris information and clock corrections, as well as the almanac for the entire constellation of satellites. The almanac is a reduced set of the ephemeris parameters that can be generated from ephemeris information, at a reduced resolution and accuracy. Both the ephemeris data and the almanac data transmitted by the GNSS satellites are in Keplerian coordinates. However, due to slow data transfers from GPS satellites to the user terminals, the transmission of such information to the user terminals directly from the GPS satellites can take up a substantial amount of time (e.g., up to 55 seconds for valid almanac data, up to 15 minutes with no information, etc.). A prolonged first fix time, which is the period required for a GPS receiver to acquire satellite signals and navigation data and to calculate a position solution, can negatively impact associated applications, and thus, user experience. Without having the ephemeris or almanac information, a user terminal will not be able to quickly determine which of the GPS satellites from the constellation are visible at any time, and thereby, must perform an exhaustive search. Receiving a separate faster broadcast from an alternative source, for example a communications system, containing the ephemeris and almanac reduces time and power consumption by the user terminal. If the Keplerian coordinates are compressed into a format which contains fewer bits then the time to first fix can be improved further while reducing the overhead imposed on the communications system.

The ephemeris broadcast by the GPS satellites is in the format of Keplerian parameters. To reduce the time of Time To First Fix (TTFF), in a terrestrial wireless system (e.g., a 3GPP system), the ephemeris information is rebroadcast to the user terminals in the original format. In a mobile satellite system, such as Geo-Mobile Radio-1 Third Generation (GMR-1 3G), for the purpose of saving spectrum, the ephemeris of GPS satellites is preprocessed at the satellite base station subsystem (SBSS) and broadcast to the remote terminals in a much more compressed format of Earth centered Earth fixed (ECEF) coordinates. For a wireless terminal that can be used in both terrestrial and satellite systems, a function interface and approach is needed for the conversion between the ephemeris in Keplerian and ECEF formats, so that the terminal can perform TTFF in both systems.

SOME EXEMPLARY EMBODIMENTS

Therefore, there is a need for an approach for providing recovery of the ephemeris information in Keplerian coordinates to achieve a rapid first fix time, while providing the information in a format compatible with standard GPS protocols.

According to one embodiment, a method comprises receiving, at a user terminal, positioning data from a base station, wherein the positioning data is received in a second format, and wherein the second format was derived from ephemeris data broadcast via a global positioning system (GPS) in a first format. The method further comprises converting, by the user terminal, the positioning data from the second format into a third format that is compatible with a protocol of the GPS system. Further, the user terminal determines a first fix using the third format of the positioning data.

According to another embodiment, an apparatus comprises a receiver module configured to receive positioning data from a base station, wherein the positioning data is received in a second format, and wherein the second format was derived from ephemeris data broadcast via a global positioning system (GPS) in a first format. The apparatus further comprises a processor configured to convert the positioning data from the second format into a third format that is compatible with a protocol of the GPS system, and to determine a first fix using the third format of the positioning data.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a diagram depicting a process of accepting GPS Broadcast Channel information at a user terminal comprising an enhanced GPS chip, according to various exemplary embodiments;

DETAILED DESCRIPTION

An apparatus, method, and system for providing GPS ephemeris information to a user terminal using coordinate conversion algorithms are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various exemplary embodiments are described with respect to GPS positioning information, it is contemplated that other equivalent positioning systems (e.g., Galileo, GLONASS, etc.) may be used with the rapid first fix mechanism explained herein.

Figure 1A:
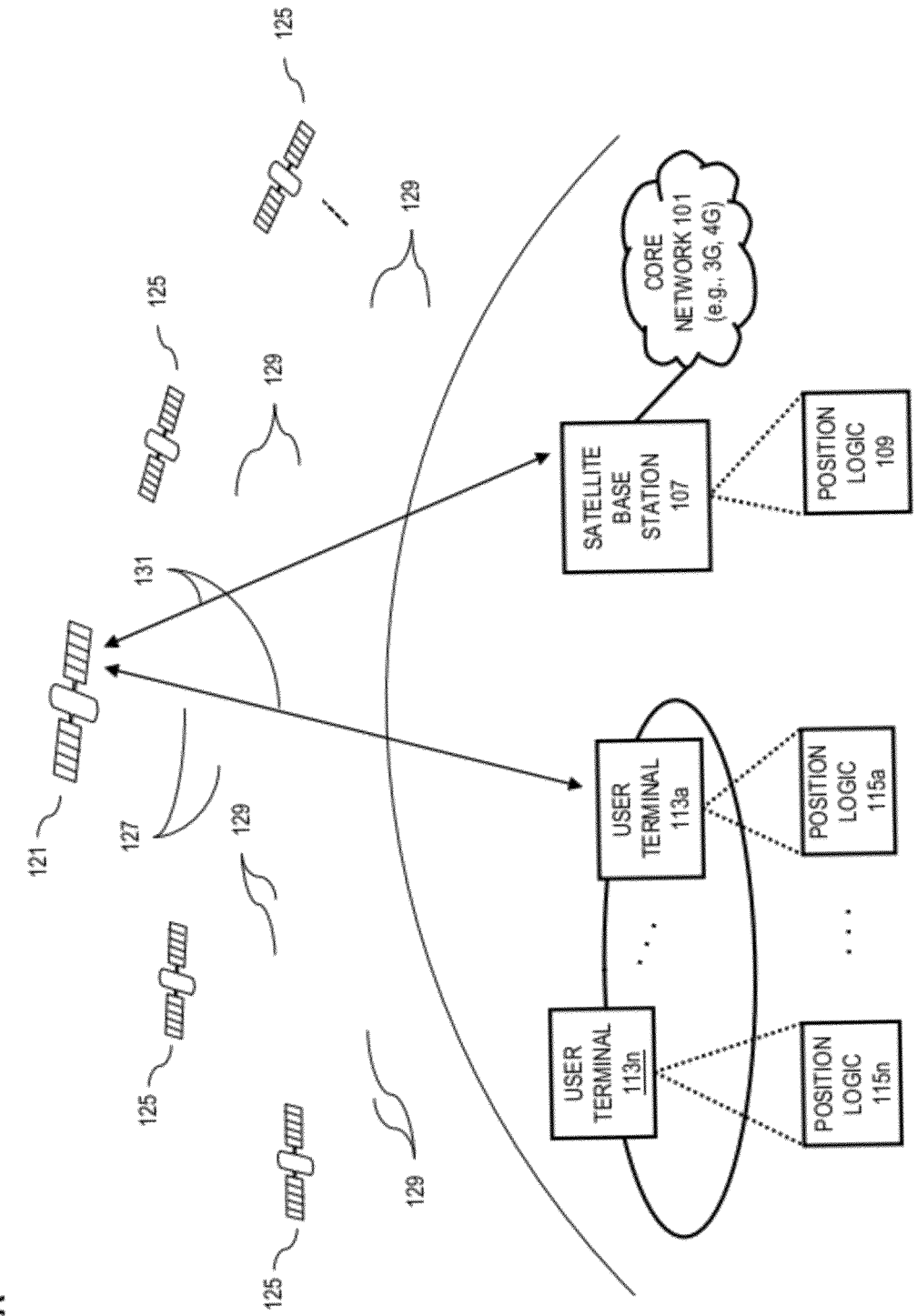
FIGS. 1A and 1B are diagrams of communication systems capable of providing global positioning system (GPS) ephemeris information to a user terminal, according to various exemplary embodiments.

FIG. 1A is a diagram of a satellite communication system capable of providing GPS ephemeris information to a user terminal, according to various exemplary embodiments. For the purpose of illustration, system 120 provides for conversion of GPS data to enable expedited acquisition of position information. In this example, a core network 101 includes a wireless network that is compliant with a Third Generation (3G) or Fourth Generation (4G) architecture; e.g., Third Generation Partnership Project (3GPP)-based. For example, the system 100 can utilize a satellite air interface (e.g., Geo-Mobile Radio-1 Third Generation, which is an evolution of the GMR-1 air interface standards). Relevant details of the Geo-Mobile Radio-1 Third Generation (GMR-1 3G) standards can be found in the ETSI publication: ETSI TS 101 376-4-8, GEO Mobile Radio Interface Specifications (Release 3); Third Generation Satellite Packet Radio Service; Part 4: Radio interface protocol specifications; Sub-part 8: Mobile Radio Interface Layer 3 Specifications; GMR-1 3G 44.008, the entirety is incorporated herein by reference.

The satellite communication system 120 includes mobile satellite system (MSS) satellite 121 (e.g., a geostationary broadband communications satellite). The satellite communications system 120 further includes a satellite base station subsystem (SBSS) 107, which communicates with user terminals (UT) 113a-113n, through the MSS satellite 121, using the bi-directional communications links 131. The GPS satellites 125 transmit GPS ephemeris information, in Keplerian coordinates, over the broadcast links 129, which can be received by the UTs 113a-113n and the SBSS 107. The SBSS 107 includes position logic 109, which is configured to perform certain preprocessing and compression functions with respect to the GPS ephemeris information, whereby the GPS ephemeris information is converted into a compressed format for transmission to the UTs 113a-113n. The UTs 113a-113n can be of various types with different form factors and transmit capabilities; e.g., sleek hand-held terminals, personal digital assistants (PDAs), vehicular terminals, portable terminals, fixed terminals, automotive telematics terminals, etc. The one or more terminals also include position logic 115a-115n, respectively. In certain embodiments, rather than obtain GPS ephemeris data directly from any of the constellation of GPS satellites 125, each of the UTs can receive the compressed format ephemeris information transmitted from the base station 107, via the satellite 121, over a designated broadcast channel 127 (GBCH). The GBCH channel, however, is a higher speed channel than the conventional GPS transmission channels 129. The UTs 113a-113n, using their respective position logic 115a-115n, can then recover the GPS ephemeris information by converting the compressed ephemeris information format received from the SBSS into a format compatible with the standard GPS ephemeris data protocols, in the original Keplerian coordinates.

Figure 1B:
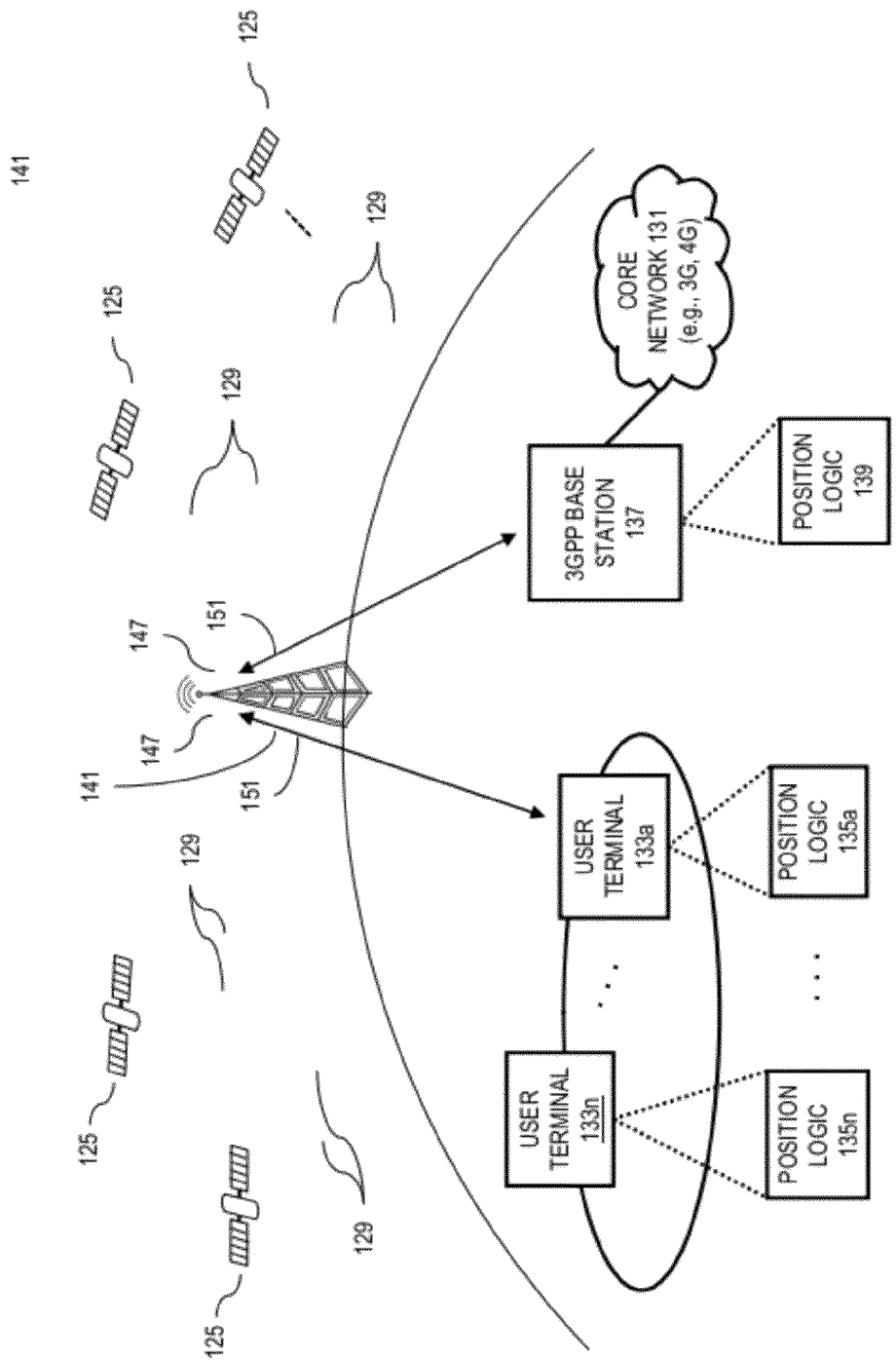

Similarly, as depicted in FIG. 1B, a terrestrial communication system 140 (e.g., any wireless communications system, such as 3GPP or GSM) can also be configured to provide GPS ephemeris information to a user terminal, according to various exemplary embodiments. The terrestrial communication system 140 includes a wireless communications tower 141. The communication system 140 further includes a wireless base station subsystem (WBSS) 137, which communicates with user terminals (UT) 133a-133n, through the communications tower 141, using the bi-directional communications links 151. Here also, the GPS satellites 125 transmit GPS ephemeris information, in Keplerian coordinates, over the broadcast links 129, which can be received by the UTs 133a-133n and the WBSS 137. The WBSS 137 includes position logic 139, which is configured to perform certain preprocessing and compression functions with respect to the GPS ephemeris information, whereby the GPS ephemeris information is converted into a compressed format for transmission to the UTs 133a-133n. Again, the UTs 133a-133n can be of various types with different form factors and transmit capabilities; e.g., sleek hand-held terminals, personal digital assistants (PDAs), vehicular terminals, portable terminals, fixed terminals, automotive telematics terminals, etc. The one or more terminals also include position logic 135a-135n, respectively. As with the satellite communications system 120 of FIG. 1A, in certain embodiments, rather than obtain GPS ephemeris data directly from any of the constellation of GPS satellites 125, each of the UTs can receive the compressed format ephemeris information transmitted from the base station 107, via the communications tower 141, over a designated broadcast channel 147, the GPS assist channel (GACH). The GACH channel, however, is a higher speed channel than the conventional GPS transmission channels 129. The UTs 133a-133n, using their respective position logic 115a-115n, can then recover the GPS ephemeris information by converting the compressed ephemeris information format (the GACH information) received from the WBSS into a format compatible with the standard GPS ephemeris data protocols, in the original Keplerian coordinates.

The preprocessing and compression functions of the SBSS and the WBSS are described in further detail in U.S. Pat. No. 6,067,045, "Communication network initialization apparatus and method for fast GPS-based positioning," and U.S. Pat. No. 6,400,319, "Communication network initialization apparatus and method for fast GPS-based positioning," the entireties of which are incorporated herein by reference (collectively "the '045 and '319 patents").

While the remainder of the Detailed Description describes various exemplary embodiments with respect to the satellite system 120 of FIG. 1A, it will, however, be evident that such exemplary embodiments could be implemented on a terrestrial communication system 140, with corresponding components performing corresponding functions, without departing from the broader scope of the invention as set forth in the claims that follow.

In operation a GPS receiver requires GPS satellite almanac information, its own position to within a few hundred kilometers, and time to within a few seconds, in order to limit the search time to the few satellites out of the total of 32 which might currently be in view. In order to actually acquire a GPS position fix, however, the receiver requires ephemeris information. The ephemeris and almanac are in the form of Keplerian orbital parameters.

As described in further detail below, the mobile satellite system satellite 121 can bi-directionally communicate with the SBSS 107 and the one or more terminals 113a-113n over the communication links 131. Further the GPS satellites 125 broadcast their ephemeris information to both the SBSS 107 and the user terminals 113a-113n via the communication links 129. The SBSS 107 can receive the GPS ephemeris information from the GPS satellites 125 directly, and employ the position logic 109 to pre-process and convert the GPS ephemeris information into a compressed format. The SBSS then retransmits the compressed format GPS ephemeris information (the GBCH information) to the terminals 113a-113n, via the satellite 121, over the GBCH channel 127. The GBCH information, for example, can include satellite position and velocity information in compressed format, using an Earth Centered Earth Fixed (ECEF) coordinate system.

It is noted that orbit parameter conversion requires position and velocity information in an Earth Centered Inertial (ECI) system. GBCH information can include the GPS ephemeris information in a compressed format. In GMR-1 3G, the link between a satellite base station subsystem and the GPS chip via the UT is the GBCH broadcast which includes (1) Satellite position and velocity data of Earth Centered Earth Fixed (ECEF) coordinates; (2) code phase offset; and (3) almanac and other GPS related information. The utilization of GBCH in GMR-1 3G systems allow a UT to achieve reduction in the TTFF because the UT can quickly read the GPS satellite ephemeris information contained in the GBCH.

While specific reference will be made thereto, it is contemplated that system 120 may embody many forms and include multiple and/or alternative components and facilities.

Figure 2A:
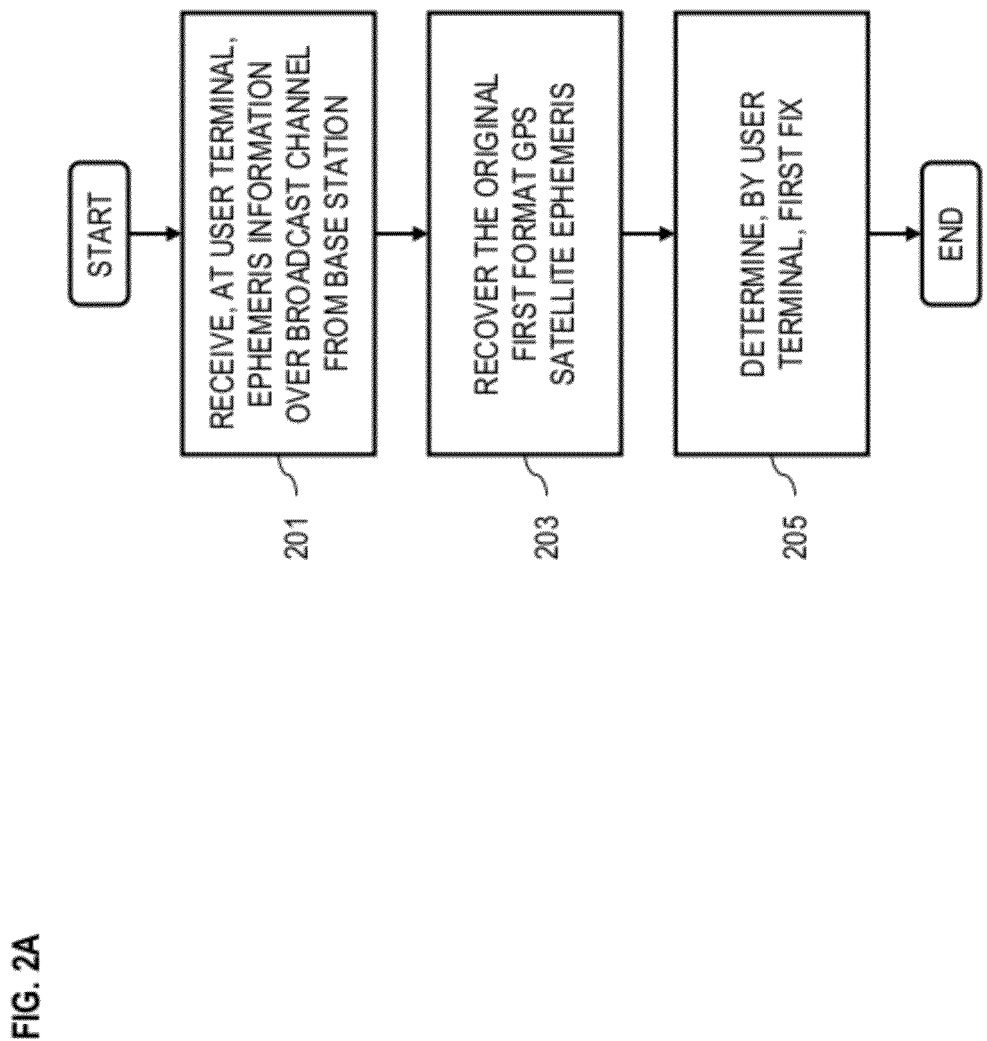
FIGS. 2A-2C are flowcharts of processes for providing GPS positioning information over a broadcast channel, according to various exemplary embodiments.

FIG. 2A is a flowchart demonstrating the steps performed by the UTs 113a-113n in processing the received GBCH information, via the satellite communication system 120 (or the UTs 133a-133n in processing the received GACH information, via the terrestrial communications system 140) over the communications links 127 (or 147). In this example, the GPS broadcast ephemeris information is broadcast in the satellite communication system 120 in a compressed format (e.g., in ECEF coordinates). In step 201, the UTs 113a-113n receive the compressed format GPS ephemeris information, over the broadcast link 127, via the satellite 121. In the step 203, the UTs 113a-113n convert the compressed format of the GPS ephemeris information recover the GPS ephemeris information in a format (in Keplerian coordinates) compatible with the standard GPS protocol. The recovered GPS ephemeris information can then be input to a standard GPS receiver located in the user terminal. Using the recovered format of the GPS data, the UTs 113a-113n can determine a first fix, in step 205. For example, the UTs 113a-113n can receive signals from visible GPS satellites 125 using their respective position logic 115a-115n and GPS chips. Subsequently, the UTs 113a-113n, again using their respective logic 115a-115n and GPS chips and the ephemeris data, can calculate their individual position. This process provides a resolution to the two goals, one, enable the terminal to reduce its TTFF, and two, reduce the overhead power used in the GBCH transmission.

Figure 2B:
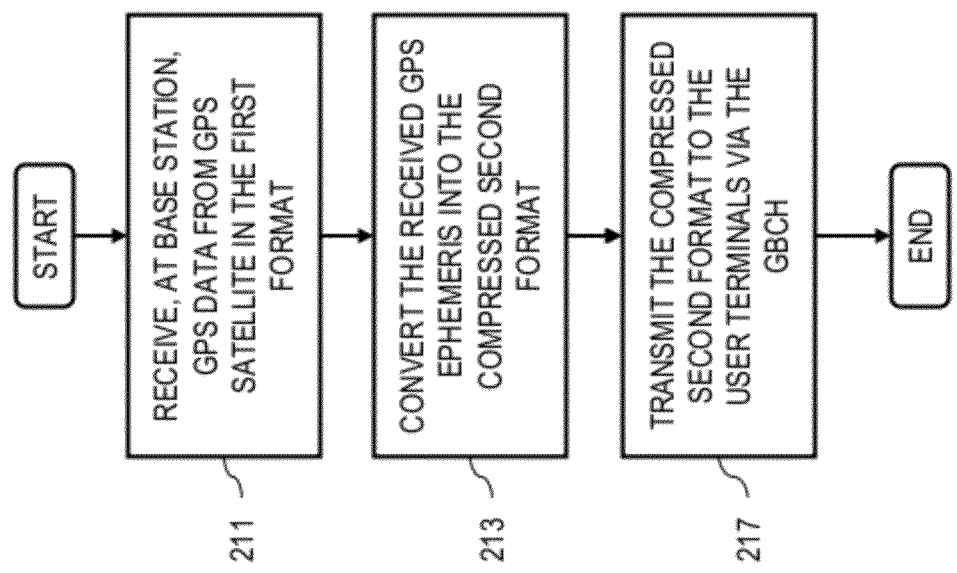

FIG. 2B is a flowchart demonstrating the steps performed by the SBSS 107 in processing the GPS data received from the GPS satellites 125 via the links 129, according to various embodiments. In step 211, the SBSS 107 receives the GPS data from one or more GPS satellites in a standard GPS format. The GPS data, for example, includes Keplerian orbital parameters. The SBSS 107 converts the received GPS ephemeris information into a preprocessed, compressed format, in step 213. The compressed format GPS ephemeris information is to be transmitted to the user terminals over the GBCH. In step 217, the SBSS broadcasts GBCH ephemeris information to the one or more user terminals 113a-113n via the GBCH using the bi-directional communications links 127. The GBCH ephemeris information, in the compressed format, includes satellite position and velocity data in ECEF coordinates, code phase offset, and almanac and other GPS related information. Again, further details of the processing by the SBSS can be found in the '045 and '319 patents.

Figure 2C:
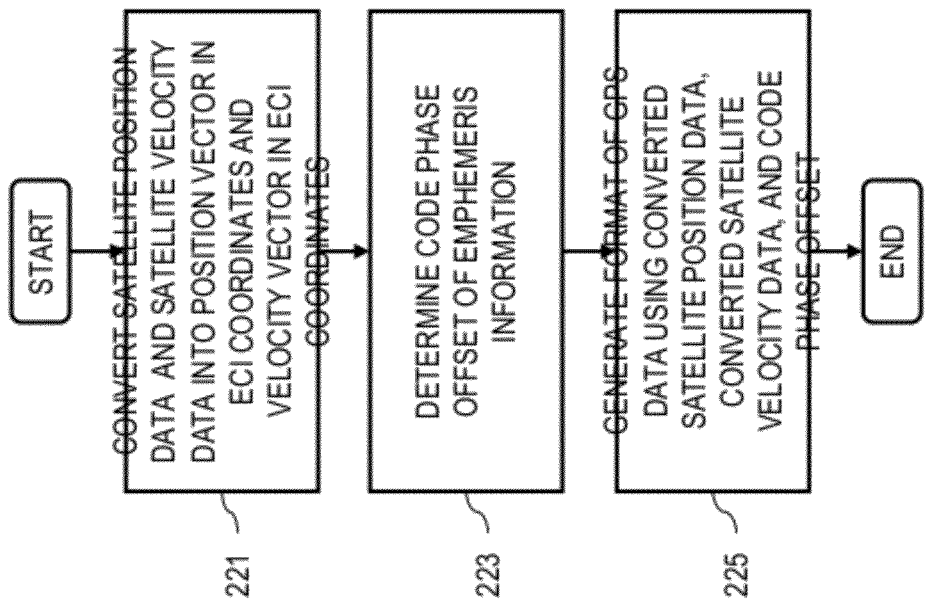

FIG. 2C is a flowchart demonstrating the steps performed by the one or more user terminals 113a-113n in determining an ECEF position vector to be used in obtaining a position fix, according to various embodiments. In step 221, the one or more terminals 113a-113n convert the satellite position data and the satellite velocity data into a position vector in ECI coordinates and a velocity vector in the ECI coordinates. The one or more terminals 113a-113n determine a code phase offset of the ephemeris information, in step 223. In step 225, the one or more terminals 113a-113n generate the second format of the GPS data using the converted satellite position data and the converted satellite velocity data, and the code phase offset.

An implication of the compressed ephemeris in the GBCH broadcast information is that it is broadcast in a format different from the standard GPS ephemeris. Thus, the UT has to be implemented such that it can read the GPS ephemeris information in the modified format contained in the GBCH information. The two alternative approaches for the terminal implementation are shown in FIG. 3 and FIG. 4, respectively.

FIG. 3 is a diagram of a process demonstrating a first approach for providing conversion of compressed ephemeris transmitted via the GBCH 119 into the standard GPS ephemeris by a user terminal 113 utilizing an enhanced GPS chip 301. The enhanced GPS chip 301 inside the user terminal 113 can be an altered GPS chip, such that it can accept the GBCH information. Because there is significantly less data in the GBCH broadcast than contained in the original format the transmission time, and therefore the time TTFF is likewise significantly reduced. By way of example, GBCH periodicity in the GMR-1 3G mobile satellite system is 2.76 seconds in order to broadcast the ephemeris for 12 GPS satellites (as represented by satellites 125) using the communications satellite 121 and the communications links 127 of FIG. 1A. Conventionally, there is no interface defined for a typical GPS chip (i.e., commercial off-the-shelf chip) to receive the ephemeris in the ECEF coordinate system. The method described in FIG. 3, however, would require an altered GPS chip which implements this interface.

Figure 4:
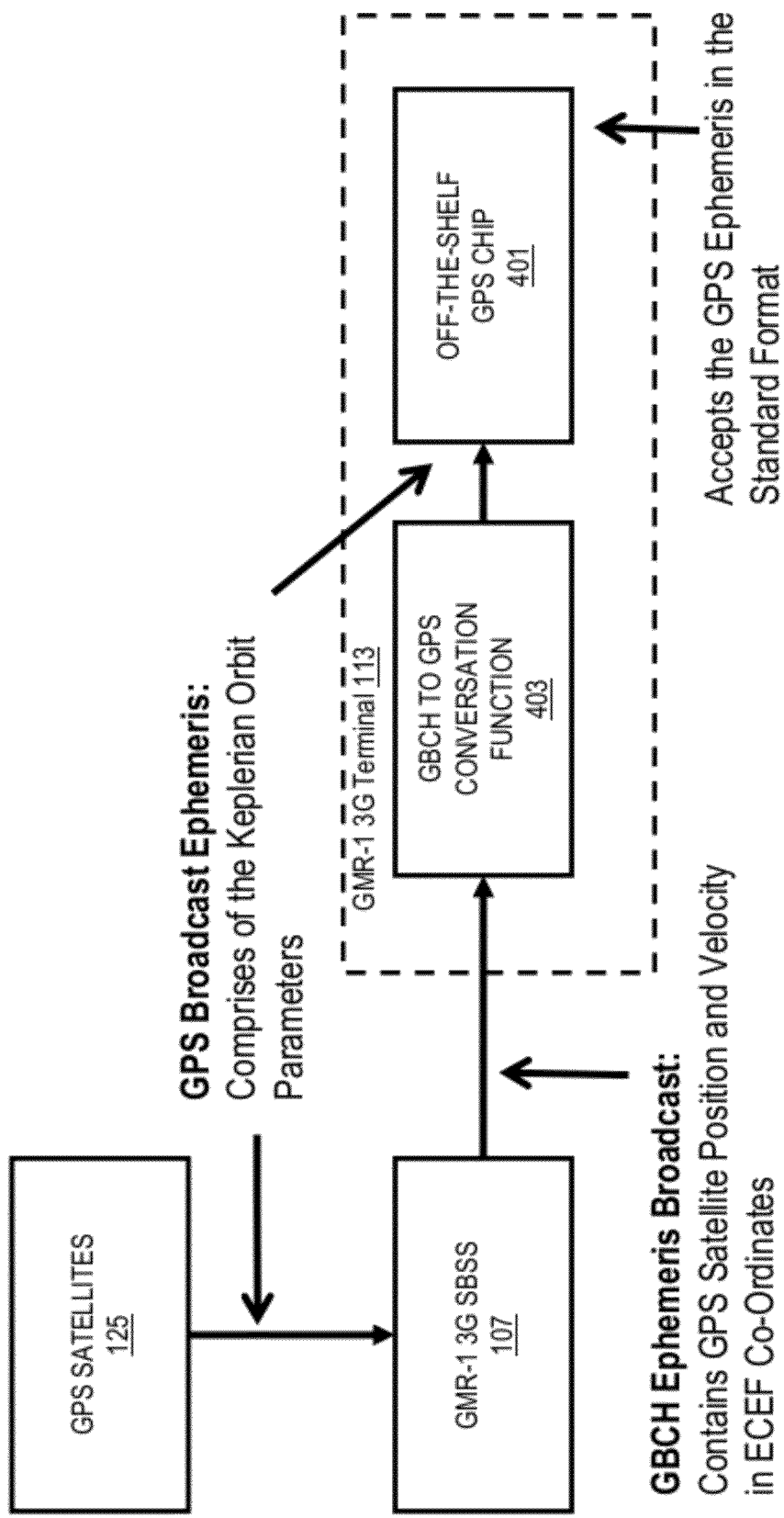
FIG. 4 is a diagram depicting a process of accepting GPS Broadcast Channel information at a user terminal comprising a commercial off-the-shelf GPS chip, according to various exemplary embodiments.

FIG. 4 is a diagram of a process demonstrating a second approach for providing conversion of compressed ephemeris in the GBCH into the standard GPS ephemeris by a user terminal 113 utilizing a commercial off-the-shelf (COTS) GPS chip 401. The alternative approach is to implement at the user terminal a function 403 that converts the GBCH information into a format that is accepted by the COTS GPS chip

401. Therefore function operates as a pre-processor that converts the GBCH information into a format that is accepted by the COTS GPS chip 401.

Figure 5:
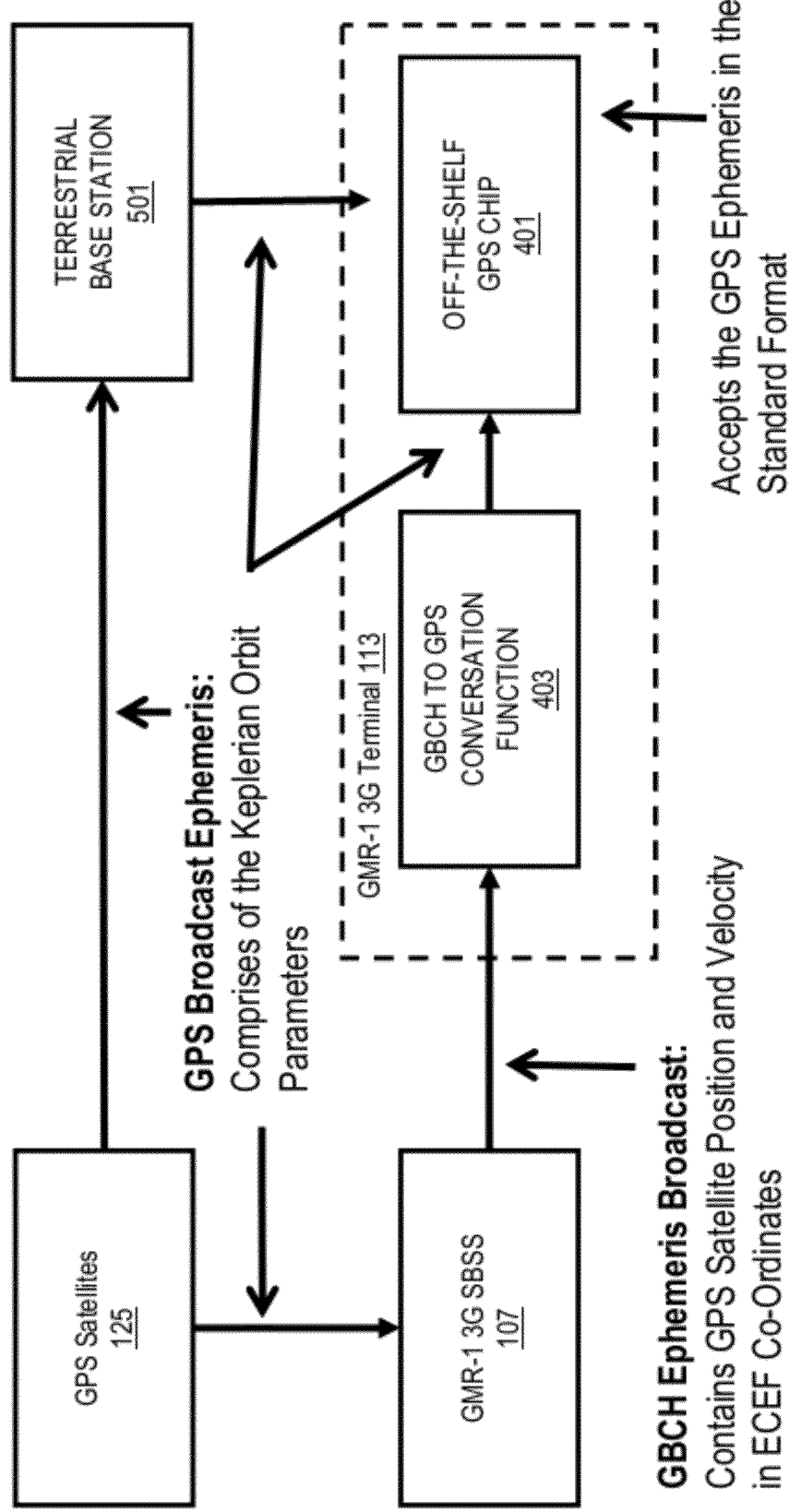
FIG. 5 is a diagram depicting a process of accepting GPS Broadcast Channel information at a user terminal comprising a commercial off-the-shelf GPS chip, according to various exemplary embodiments.

With the GBCH to GPS pre-processing conversion function 403 implemented at the terminal 113, the terminal 113 can accept the GPS ephemeris information from a GPS satellite 125 directly, from the 3GPP terrestrial base-stations 501 which is rebroadcasting the GPS ephemeris in the original uncompressed format and from SBSS 107 which is rebroadcasting the GPS ephemeris in the compressed format. This process is depicted in the diagram of FIG. 5, and described in 3GPP TS 44.035 Location Service (LCS); Broadcast network assistance for Enhanced Observed Time Difference (E-OTD) and Global Positioning Systems (GPS) positioning methods, the entirety of which is incorporated herein by reference. The 3G cellular base-station transmits an analogue of the GBCH, the GPS Assist Channel (not shown). The GPS-Assist Channel broadcast in the terrestrial systems contains the GPS information in the uncompressed standard format. Therefore, the above interface problem specific to the GBCH ephemeris broadcast does not arise.

Figure 6:
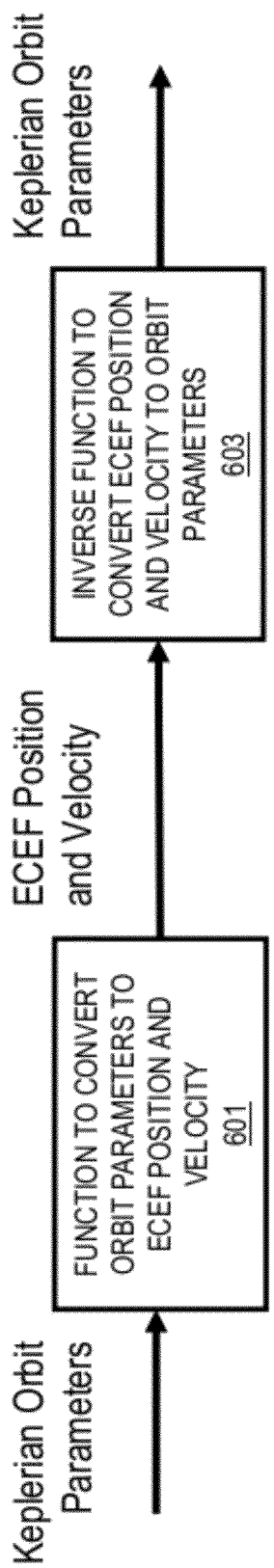
FIG. 6 is a diagram depicting a process of converting GPS Broadcast Channel information to a GPS format, according to various exemplary embodiments.

FIG. 6 depicts the context of the proposed GBCH to GPS conversion function in a different manner. The proposed function can be thought of as a dual to (or inverse of) the compression function that resides at the SBSS 107 and contained in position logic 109. In this case the proposed function recovers the uncompressed orbital parameters at the terminal 113 for input to the COTS GPS chip 401, as well as. In exemplary embodiments, a conversion function 601 to convert orbit parameters to ECEF position and velocity coordinates can be implemented at the SBSS 107. In exemplary embodiments, an inverse conversion function 603 to convert ECEF position and velocity coordinates to orbit parameters can be implemented at the terminal 113 for recovery of the original Keplerian orbit parameters. The two functions are depicted symbolic form in Table 1.

TABLE 1

Two Dual Functions

| | Function | | Implemented | |
|---|---|---|---|---|
| Symbol | Input | Output | At | Purpose |
| $f(\bullet)$ | Keplerian Orbit Parameters | Satellite Position and Velocity in ECEF Coordinates | GMR-1 3G SBSS | Conversion of the GPS broadcast ephemeris to the GBCH format |
| | | | COTS GPS chip | Perform the position fix using the GPS broadcast ephemeris |
| $f^{-1}(\bullet)$ | Satellite Position and Velocity in ECEF Coordinates | Keplerian Orbit Parameters | GMR-1 3G User Terminal | Conversion of the GBCH broadcast ephemeris to the GPS format that can be used by the COTS GPS chip |

Conversion of the GPS satellite ephemeris information into the GBCH information is provided by the function $f(.)$. The ephemeris parameters broadcast by the GPS satellites are depicted in Table 2 and are discussed in detail in ICD-GPS-200 Naystar GPS Space Segment and Navigation User Interfaces, Version C, April 2000 (Navastar GPS ICD), the entirety of which is incorporated herein by reference.

TABLE 2

Ephemeris and Almanac Parameters broadcast by the GPS Satellites

| | | Ephemeris | | Almanac | |
|---|---|---|---|---|---|
| Information Element | Units | Scale Factor | Bits | Scale Factor | Bits |
| Satellite ID | | 1 | 6 | | |
| $T_{GD}$ | seconds | $2^{-31}$ | 8 | | |
| $t_{oc}$ | seconds | $2^4$ | 16 | | |
| $a_{f2}$ | sec/sec$^2$ | $2^{-55}$ | 8 | | |
| $a_{f1}$ | sec/sec | $2^{-43}$ | 16 | $2^{-38}$ | 11 |
| $a_{f0}$ | seconds | $2^{-31}$ | 22 | $2^{-20}$ | 11 |
| $C_{rs}$ | meters | $2^{-5}$ | 16 | | |
| $\Delta n$ | semi-circles/sec | $2^{-43}$ | 16 | | |
| $M_0$ | Semi-circles | $2^{-31}$ | 32 | $2^{-23}$ | 24 |
| $C_{uc}$ | radians | $2^{-29}$ | 16 | | |
| e | dimensionless | $2^{-33}$ | 32 | $2^{-21}$ | 16 |
| $C_{us}$ | radians | $2^{-29}$ | 16 | | |
| $(A)^{1/2}$ | Meters$^{1/2}$ | $2^{-19}$ | 32 | $2^{-11}$ | 24 |
| $t_{oe}$ | seconds | $2^4$ | 16 | $2^{12}$ | 8 |
| $C_{ic}$ | radians | $2^{-29}$ | 16 | | |
| OMEGA$_0$ | semi-circles | $2^{-31}$ | 32 | $2^{-23}$ | 24 |
| $C_{is}$ | radians | $2^{-29}$ | 16 | | |
| $i_0$ | semi-circles | $2^{-31}$ | 32 | $2^{-19}$ Note 1 | 16 |
| $C_{rc}$ | meters | $2^{-5}$ | 16 | | |
| $\omega$ | semi-circles | $2^{-31}$ | 32 | $2^{-23}$ | 24 |
| OMEGAdot | semi-circles/sec | $2^{-43}$ | 24 | $2^{-38}$ | 16 |
| Idot | semi-circles/sec | $2^{-43}$ | 14 | | |

Note 1:
Relative to i0 = 0.30 semi-circles

The outputs of the function are depicted in Table 3. An ECEF position vector $p_s(t)$ is used by the COTS GPS chip to obtain the position fix.

TABLE 3

Outputs of the function $f(\bullet)$.

| Symbolic Notation | Description |
|---|---|
| $p_s(t) = [x_s(t), y_s(t), z_s(t)]^T$ | Satellite position vector in ECEF co-ordinates |

Figure 7:
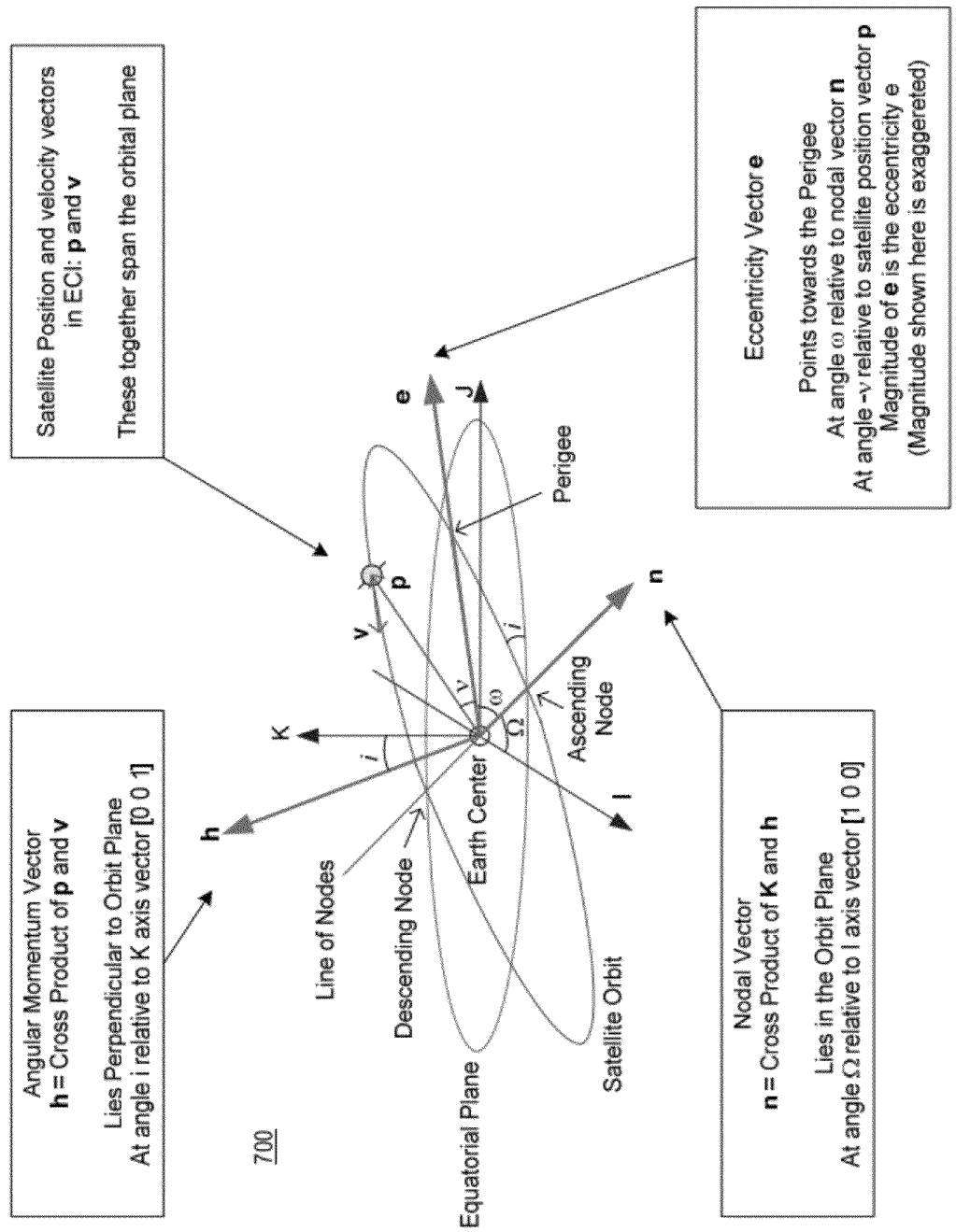
FIG. 7 is a diagram depicting the position of a GPS satellite in an inclined orbit with respect to the Earth Centered Inertial (ECI) coordinate system, according to various exemplary embodiments.
Figure 8:
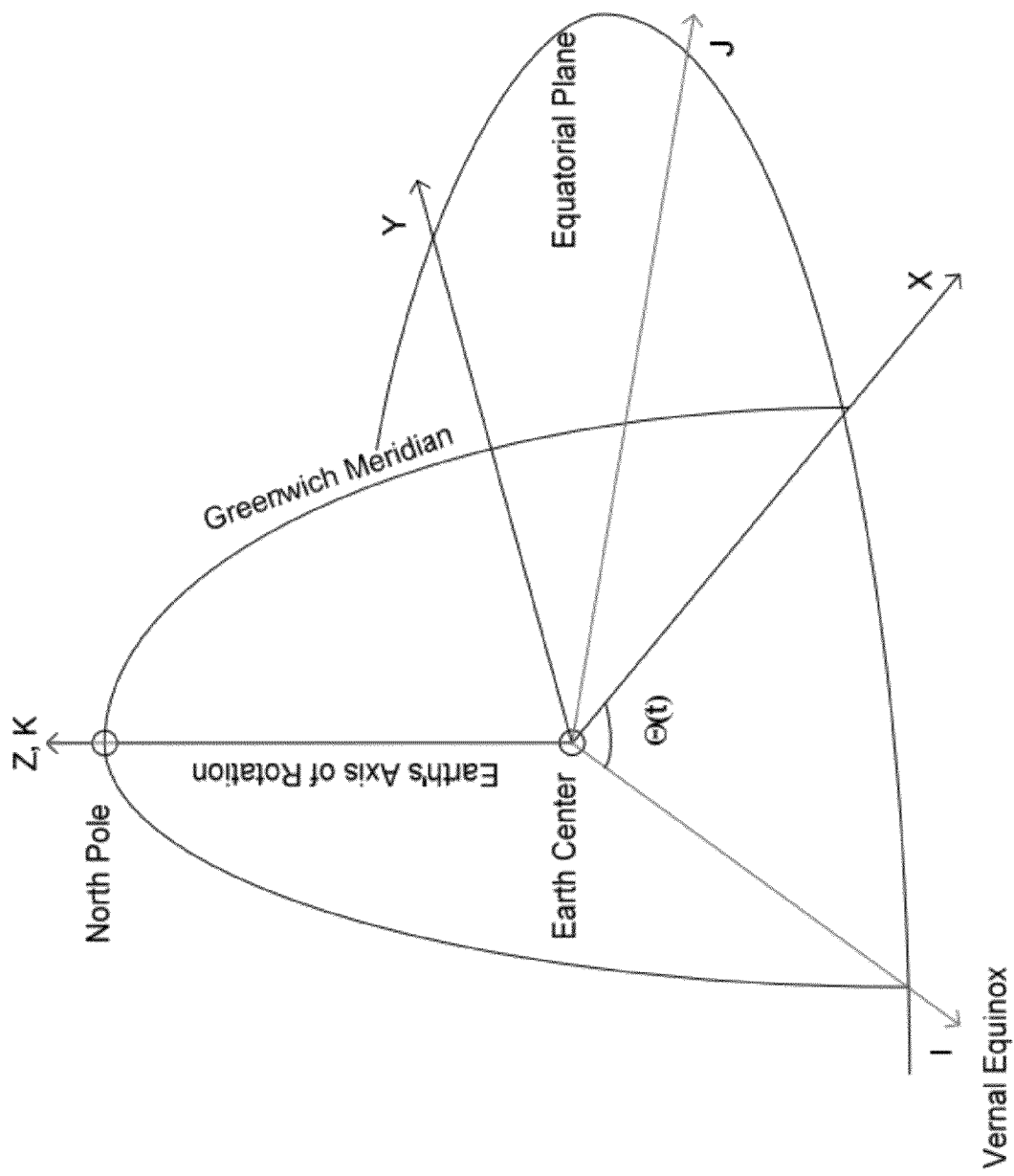
FIG. 8 is a diagram depicting the diagrammatic relationship between ECI coordinates and Earth Centered Earth Fixed (ECEF) coordinates, according to various exemplary embodiments.

FIG. 7 shows the position of a GPS satellite, such as satellite 110, in an inclined orbit with respect to the ECI coordinate system 700. In this system 700, $\bar{i}$ is a unit vector in the direction of the vernal equinox, $\bar{k}$ is a unit vector along the axis of the Earth rotation and $\bar{j}$ is the cross product. The inclined orbit is tilted an angle i(t) from the Earth equatorial plane along the line of nodes. The angular momentum vector $\bar{h}$ is perpendicular to the inclined orbit plane. FIG. 8 provides a diagram 800 showing the relationship between ECI coordinates and Earth Centered Earth Fixed (ECEF) coordinates.

Table 4 lists an exemplary set of keplerian orbital parameters that can be converted to ECEF position vectors.

TABLE 4

Keplerian Orbital Parameters

| Parameter | Notation |
|---|---|
| v(t) | True Anomaly |
| ω(t) | Argument of Perigee |
| u(t) = v(t) + ω(t) | Right ascension of ascending node, |
| Ω(t) | Right Ascension of the Ascending Node |
| Θ(t) | Earth's diurnal rotation phase |
| r(t) | Orbit radius at the current time t |
| A | Semi-major axis of orbital ellipse |
| e | Numerical eccentricity of ellipse |
| M (t) | Mean Anomaly |
| E (t) | Eccentric Anomaly |
| i(t) | Inclination angle |

The formula to convert the above orbit parameters to the ECEF position vector $p_s(t)$, is as follows.

$$p_s(t) = \begin{bmatrix} x_s(t) \\ y_s(t) \\ z_s(t) \end{bmatrix} =$$

$$r(t) \times \begin{bmatrix} \cos u(t)\cos(\Omega(t) - \Theta(t)) - \sin u(t)\sin(\Omega(t) - \Theta(t))\cos t(t) \\ \cos u(t)\sin(\Omega(t) - \Theta(t)) + \sin u(t)\cos(\Omega(t) - \Theta(t))\cos t(t) \\ \sin u(t)\sin t(t) \end{bmatrix}$$

The above formula essentially involves (1) calculation of the In-Orbit Plane Position Vector, (2) conversion of the In-Orbit Plane Position Vector to the ECI Position Vector, and (3) conversion of the ECI Position Vector to the ECEF Position Vector.

The orbital plane position vector $p_o(t)$ is defined as follows.

$$p_o(t) = A \times (1 - e \times \cos E(t)) \begin{bmatrix} \cos v(t) \\ \sin v(t) \\ 0 \end{bmatrix}$$

A new orbital plane vector $p_{oo}(t)$ is obtained by rotating $p_o(t)$ with respect to the Z-axis by angle ω(t).

$$p_{oo}(t) = R_3(-\omega(t)) \times p_o(t) =$$

$$A \times (1 - e \times \cos E(t)) \begin{bmatrix} \cos(v(t) + \omega(t)) \\ \sin(v(t) + \omega(t)) \\ 0 \end{bmatrix} = A \times (1 - e \times \cos E(t)) \begin{bmatrix} \cos u(t) \\ \sin u(t) \\ 0 \end{bmatrix}$$

Here u(t)=u(t)+ω(t) is known as the argument of latitude. The rotation matrix $R_3(\alpha)$ is defined as follows, where in the above, the rotation is by $\alpha=-\omega(t)$ is about the angular momentum vector $\bar{h}$. For the non-inclined orbit $\bar{h}$ is the same as $\bar{k}$.

$$R_3(\alpha) = \begin{bmatrix} \cos\alpha & \sin\alpha & 0 \\ -\sin\alpha & \cos\alpha & 0 \\ 0 & 0 & 1 \end{bmatrix}$$

The ECI position vector p(t) can be expressed as a rotated version of the orbital plane position vector $p_o(t)$ or $p_{oo}(t)$.

$$p(t) = R_3(-\Omega(t)) \times R_1(-i(t)) \times R_3(-\omega(t)) \times p_o(t) = R_3(-\Omega(t)) \times R_1(-i(t)) \times p_{oo}(t)$$

Here, the rotation matrix $R_1(\alpha)$ where $\alpha=-i(t)$ and is defined as rotation about the nodal vector $\bar{n}$.

$$R_1(\alpha) = \begin{bmatrix} 1 & 0 & 0 \\ 0 & \cos\alpha & \sin\alpha \\ 0 & -\sin\alpha & \cos\alpha \end{bmatrix}$$

The ECEF position vector $p_s(t)$ can also be expressed as a rotated version of the ECI position vector p(t).

$$p_s(t) = R_3(\Theta(t)) \times p(t)$$

The diagrammatic relation between the ECI and ECEF coordinate systems is depicted in FIG. 8.

ECEF X-Y axes are obtained by rotating ECI I-J axes by angle the GMST Θ(t); ECI K axis lies perpendicular to the X-Y plane.

The ECEF position vector $p_s(t)$ can be expressed as follows.

$$p_s(t) = \begin{bmatrix} x_s(t) \\ y_s(t) \\ z_s(t) \end{bmatrix} =$$

$$r(t) \times \begin{bmatrix} \cos u(t)\cos(\Omega(t) - \Theta(t)) - \sin u(t)\sin(\Omega(t) - \Theta(t))\cos t(t) \\ \cos u(t)\sin(\Omega(t) - \Theta(t)) + \sin u(t)\cos(\Omega(t) - \Theta(t))\cos t(t) \\ \sin u(t)\sin t(t) \end{bmatrix} =$$

$$R_3(\Theta(t)) \times R_3(-\Omega(t)) \times R_1(-i(t)) \times R_3(-\omega(t)) \times p_o(t) =$$

$$R_3(\Theta(t)) \times R_3(-\Omega(t)) \times R_1(-i(t)) \times p_{oo}(t)$$

Here, the rotation matrix $R_3(\alpha)$ is defined above, where the rotation by $\alpha=-\Omega(t)$ and then by $\alpha=\Theta(t)$ are about the Earth's axis of rotation $\bar{k}$.

The mean anomaly is a linear function of time, i.e., $$M(t) = \frac{2\pi}{T_{per}} t = n \times t \text{ where } n = \frac{2\pi}{T_{per}}$$

is the mean motion and $$T_{per} = 2\pi \times \sqrt{\frac{A^3}{\mu}}.$$

Table 5 provides a description of the mean anomaly described in Naystar GPS ICD.

TABLE 5

Derivation of Mean Anomaly

| | |
|---|---|
| $\mu = 3.986 \times 10^{14}$ m$^3$/sec$^2$ | WGS 84 value of the Earth's universal gravitational parameter |
| $\Omega'_e = 7.292$ rad/sec | WGS 84 value of the Earth's rotation rate |
| $A = (\sqrt{A})^2$ | Semi-major axis |
| $n_o = \sqrt{\dfrac{\mu}{A^3}}$ | Computed mean motion—rad/sec |
| $t_k = t - t_{oe}$ | Time from ephemeris reference epoch. t is time for which computation is desired. $t_k$ must account for GPS weekly rollovers, i.e., if $t_k <$ -302400 sec, add 604800. If $t_k > 302400$, subtract 604800 |
| $n = n_o + \Delta n$ | Corrected mean motion |
| $M_k = M_o + n t_k$ | Mean anomaly |

The eccentric anomaly E(t) is derived from M(t) using the following relation.

$$M(t) = E(t) - e \times \sin E(t)$$

Here, since the unknown quantity E(t) appears on the right side of the equation, the solution of the above equation is usually arrived at by a numerical method. The true anomaly v(t) is related to the eccentric anomaly E(t) as follows.

$$v(t) = 2 \times \tan^{-1}\left(\sqrt{\dfrac{1-e}{1+e}} \times \tan\left(\dfrac{E(t)}{2}\right)\right)$$

The above calculation is described in Table 6, as follows.

TABLE 6

Derivation of Eccentric and True Anomalies

| | |
|---|---|
| $M_k = E_k - e \sin E_k$ | Keppler's equation for eccentric anomaly (solved by iteration)—radians |
| $v_k = \tan^{-1}\left\{\dfrac{\sin v_k}{\cos v_k}\right\}$ $= \tan^{-1}\left\{\dfrac{\sqrt{1-e^2} \sin E_k/(1-e \cos E_k)}{(\cos E_k - e)/(1 - e \cos E_k)}\right\}$ | True anomaly |
| $E_k = \cos^{-1}\left\{\dfrac{e + \cos v_k}{1 + e + \cos v_k}\right\}$ | Eccentric anomaly |

After calculation v(t) as described in step 2, the calculation of the Argument of Latitude $u(t) = \theta(t) + \omega(t)$ follows since the argument of perigee $\omega(t)$ is one of the broadcast parameters, and thus, requires no calculation. The calculation of the Argument of Latitude is shown in Table 7 as follows.

TABLE 7

Derivation of Augment of Latitude

| | |
|---|---|
| $\Phi_k = v_k + \omega$ | Argument of latitude |
| $\delta u_k = C_{us} \sin 2\Phi_k + C_{uc} \cos 2\Phi_k$ | Argument of latitude correction |
| $\delta r_k = C_{rc} \cos 2\Phi_k + C_{rs} \sin 2\Phi_k$ | Radius correction |
| $\delta i_k = C_{ic} \cos 2\Phi_k + C_{is} \sin 2\Phi_k$ | Correction to inclination |
| $u_k = \Phi_k + \delta u_k$ | Corrected argument of latitude |

The in-orbit plane position vector is given as follows.

$$p_{oo}(t) = A \times (1 - e \times \cos E(t)) \begin{bmatrix} \cos u(t) \\ \sin u(t) \\ 0 \end{bmatrix}$$

The above calculation is depicted in Table 8 as follows.

TABLE 8

Derivation of In-Orbit Position Vector

| | |
|---|---|
| $r_k = A(1 - e \cos E_k) + \delta r_k$ | Corrected radius |
| $x_k' = r_k \cos u_k$ | Position in orbital plane |
| $y_k' = r_k \sin u_k$ | Position in orbital plane |

In the above, $u_k = v(t) + \omega(t)$ and $r_k = A \times (1 - e \times \cos E(t))$.

Angle $\Omega(t) - \Theta(t)$ is calculated by the reference values as follows.

TABLE 9

Derivation of Angle

| | |
|---|---|
| $\Omega_e' = 7.292$ rad/sec | WGS 84 value of the Earth's rotation rate |
| $\Omega_k = \Omega_0 + (\Omega' - \Omega_e') t_k - \Omega_e' t_{oe}$ | Corrected longitude of ascending node |

In the above, $\Omega(t) = \Omega_0 + \Omega' t_k$ and $\Theta(t) = \Omega_e' t_{oe} + \Omega_e' t_k$.

All the necessary variables in the calculation of the ECEF position vectors are now formed. The ECEF position vector $p_s(t)$ is, thus, calculated using the in-orbit position vector $p_{oo}(t)$ as follows:

$$p_s(t) = R_3(\Theta(t)) \times R_3(-\Omega(t)) \times R_1(-i(t)) \times p_{oo}(t)$$

The above calculation is described in Table 10 as follows.

TABLE 10

Derivation of ECEF Position Vector

| | |
|---|---|
| $x_k = x_k' \cos \Omega_k - y_k' \cos i_k \sin \Omega_k$ | Earth-fixed coordinate |
| $y_k = x_k' \sin \Omega_k - y_k' \cos i_k \cos \Omega_k$ | Earth-fixed coordinate |
| $z_k = y_k' \sin i_k$ | Earth-fixed coordinate |

A summary of the above described steps is depicted in Table 11.

TABLE 11

GPS Satellite Position Computation

| | |
|---|---|
| $\mu = 3.986 \times 10^{14}$ m$^3$/sec$^2$ | WGS 84 value of the Earth's universal gravitational parameter |
| $\Omega'_e = 7.292$ rad/sec | WGS 84 value of the Earth's rotation rate |
| $A = (\sqrt{A})^2$ | Semi-major axis |
| $n_o = \sqrt{\dfrac{\mu}{A^3}}$ | Computed mean motion—rad/sec |
| $t_k = t_{oe}$ | Time from ephemeris reference epoch. t is time for which computation is desired. $t_k$ must account for GPS weekly rollovers, i.e., if $t_k < -302400$ sec, add 604800. If $t_k > 302400$, subtract 604800 |
| $n = n_o + \Delta n$ | Corrected mean motion |
| $M_k = M_o + n t_k$ | Mean anomaly |
| $v_k = \tan^{-1}\left\{\dfrac{\sin v_k}{\cos v_k}\right\}$ $= \tan^{-1}\left\{\dfrac{\sqrt{1-e^2}\sin E_k/(1-e\cos E_k)}{(\cos E_k - e)/(1-e\cos E_k)}\right\}$ | True anomaly |
| $E_k = \cos^{-1}\left\{\dfrac{e+\cos v_k}{1+e+\cos v_k}\right\}$ | Eccentric anomaly |
| $\Phi_k = v_k + \omega$ | Argument of latitude |
| $\delta u_k = C_{us}\sin 2\Phi_k + C_{uc}\cos 2\Phi_k$ | Argument of latitude correction |
| $\delta r_k = C_{rc}\cos 2\Phi_k + C_{rs}\sin 2\Phi_k$ | Radius correction |
| $\delta i_k = C_{ic}\cos 2\Phi_k + C_{is}\sin 2\Phi_k$ | Correction to inclination |
| $u_k = \Phi_k + \delta u_k$ | Corrected argument of latitude |
| $r_k = A(1 - e\cos E_k) + \delta r_k$ | Corrected radius |
| $i_k = i_o + \delta i_k + i' t_k$ | Corrected inclination |
| $x'_k = r_k \cos u_k$ | Position in orbital plane |
| $y'_k = r_k \sin u_k$ | Position in orbital plane |
| $\Omega_k = \Omega_0 + (\Omega' - \Omega'_e)t_k - \Omega'_e t_{oe}$ | Corrected longitude of ascending node |
| $x_k = x'_k \cos \Omega_k - y'_k \cos i_k \sin \Omega_k$ | Earth-fixed coordinate |
| $y_k = x'_k \sin \Omega_k - y'_k \cos i_k \cos \Omega_k$ | Earth-fixed coordinate |
| $z_k = y'_k \sin i_k$ | Earth-fixed coordinate |

A UT (e.g., anyone of UTs 113a-113n) requires accurately determining a satellite's precise position at any time instance during the interval of GBCH broadcast. Thus a third order curve fit model of each in-view satellite's ECEF position vector $p_s(t)$ is created by position logic 109 (alternatively, or additionally, position logic 115a-115n). The curve fit model is used by the UT in lieu of ephemeris data, which is larger in size due to its long period of required validity. The position logic 109 maintains a curve fit model for each satellite, updated every second. In each second, the position logic 109 computes and stores each satellite's ECEF position ($x_k$, $y_k$, $z_k$), at the current time $t_0$, where k is the index of the satellite, as shown in Tables 5-10 of GMR-1 3G 44.008. In addition, satellite positions at $t_0-5$ minutes, $t_0+5$ minutes, and $t_0+10$ minutes are also be computed. The curve fitting coefficients, ($a_i$, $b_i$, $c_i$), i=0, 1, ..., 3, determined by Lagrange interpolation polynomials, characterize the following polynomials:

$$p_s(t) = \begin{bmatrix} x_s(t) \\ y_s(t) \\ z_s(t) \end{bmatrix} = \begin{bmatrix} a_0 + a_1 t + a_2 t^2 + a_3 t^3 \\ b_0 + b_1 c + b_2 t^2 + b_3 t^3 \\ c_0 + c_1 t + c_2 t^2 + c_3 t^3 \end{bmatrix}$$

The satellite velocity vector in the ECEF can be calculated by taking the time derivative of the curve fit polynomial.

$$v_s(t) = \begin{bmatrix} vx_s(t) \\ vy_s(t) \\ vz_s(t) \end{bmatrix} = \begin{bmatrix} a_1 + 2a_2 t + 3a_3 t^2 \\ b_1 + 2b_2 t + 3b_3 t^2 \\ c_1 + 2c_2 t + 3c_3 t^2 \end{bmatrix}$$

Besides the position and velocity vectors, RAN also computes the code phase offset at $t_0$, denoted as $\Delta t_{sv}(t_0)$. For the purpose that this computed code phase correction is valid for 5 minutes, RAN broadcasts $\Delta t_{sv}(t_0)$ and coefficient $a_{f1}$, neglecting all other terms from GPS satellite that are used for clock correction.

The inputs and the outputs of the forward function $f(.)$ get switched for the inverse function $f^{-1}(.)$. As described above, the UT calculates the satellite position and velocity vectors, $p_s(t)$ and $v_s(t)$, respectively, in the ECEF coordinates using the GBCH information. The two inputs to the inverse function $f^{-1}(.)$ are depicted in Table 12.

TABLE 12

Inputs to the Inverse Function

| Symbolic Notation | Description |
|---|---|
| $p_s(t) = [x_s(t), y_s(t), z_s(t)]^T$ | Satellite position vector in ECEF co-ordinates |
| T | Current time |

Table 13, below, lists the GPS satellite Keplerian parameters which are outputs of the function $f^{-1}(.)$. The mean anomaly is given the current time value of the argument of latitude. The mean motion difference is the time rate of change of u(t) evaluated at the current time. The Semi-Major Axis is the exact distance of the satellite from the center of the Earth at the current time and the orbit is assumed to be perfectly circular, i.e., the eccentricity is identically zero. Since the orbit is assumed to be a perfect circle the argument of perigee is set to zero. Other correction parameters are set to zero. In addition, other parameters are evaluated at the current time. With this set of input parameters the GPS receiver can compute the UT position very accurately only for a short time but that is all that is required for the GEO mobile satellite application. The set of output parameters form the input to the COTS GPS chip.

TABLE 13

Set of Output Parameters of the Conversion Function
Output Parameters of the Conversion Function; Forms Input to COTS GPS Chip

| Symbol | Actual Value | Value Calculated by the Conversion Function |
|---|---|---|
| $M_0$ | Mean Anomaly at Reference Time $t_{oe}$ | Argument of Latitude $u(t) = \omega(t) + v(t)$ |
| $\Delta n$ | Mean Motion Difference | Set to 0 |
| $A^{1/2}$ | Square Root of the Semi-Major Axis | Radius $r(t) = \|p(t)\|$ at the current time t |
| $\Omega_0$ | Longitude of Ascending Node of Orbit Plane at Weekly Epoch | $\Omega(t)$ |
| $i_0$ | Inclination Angle at Reference Time | $i(t)$ |
| $\Omega'$ | Rate of Right Ascension | Time rate of change of $\Omega(t)$ |
| $t_{oe}$ | Reference Time Ephemeris | Current time t |
| $i'$ | Rate of Inclination Angle | Time rate of change of $i(t)$ |
| E | Eccentricity | Set to 0 |
| $\omega$ | Argument of Perigee | |
| $C_{uc}$ | Amplitude of the Cosine Harmonic Correction Term to the Argument of Latitude | |
| $C_{us}$ | Amplitude of the Sine Harmonic Correction Term to the Argument of Latitude | |
| $C_{rc}$ | Amplitude of the Cosine Harmonic Correction Term to the Orbit Radius | |
| $C_{rs}$ | Amplitude of the Sine Harmonic Correction Term to the Orbit Radius | |
| $C_{ic}$ | Amplitude of the Cosine Harmonic Correction Term to the Angle of Inclination | |
| $C_{is}$ | Amplitude of the Sine Harmonic Correction Term to the Angle of Inclination | |

The conversion function, according to certain embodiments, can be obtained and described with several algorithmic steps. First, the current UTC time t in (year, month, day, hour, minutes, seconds) is converted to the Greenwich Meridian Sidreal Time (GMST) $\Theta(t)$. First, UTC time is converted to Julian Date (JD) by the following formula:

$$JD = 367 \times y - \left\lfloor \frac{7\left\{y + \left\lfloor \frac{mo+9}{12} \right\rfloor\right\}}{4} \right\rfloor +$$

-continued $$\left\lfloor \frac{275 \times mo}{9} \right\rfloor + d + 1721013.5 + \frac{\left(\frac{s}{60} + min\right)}{60} + h}{24}$$

Next, $T_{UT1}$ is determined using $$JD \text{ as } T_{UT1} = \frac{JD - 2451545}{36525}.$$

$T_{GMST}$ is then determined in seconds using $T_{UT1}$ as follows, where the super-scripts s and h indicate the units are for information purposes only.

$T_{GMST} = 67310.54841^s + ((87600^h \times 3600)^s + 8640184.812866^s) \times T_{UT1} + 0.093104 \times T_{UT1}^2 - 6.2 \times 10^{-6} T_{UT1}^3$ The reducing quantity is reduced to within a range of 86400 seconds (one solar day) and converted from unit of time (i.e., seconds) to degrees by dividing the result by 240. 240 seconds correspond to 1° of Earth's rotation about its rotation axis. A solar day (24 hours) corresponds to 360°, and thus, 1 hour corresponds to 360/24=15°, and 4 minutes or 240 seconds correspond to 1°.

$$\Theta(t) = \frac{T_{GMST} - \left\lfloor \frac{T_{GMST}}{86400} \right\rfloor \times 86400}{240} \text{ degrees.}$$

If $\theta_{GMST} < 0$, $\theta_{GMST} = 360° + \theta_{GMST}$

As described above, GBCH contains satellite position and velocity in ECEF coordinate system and orbit parameter conversion routines require position and velocity in ECI system. Position and velocity vectors, $p_s(t)$ and $v_s(t)$, in the ECEF coordinates are converted to the respective vectors, p(t) and $v(t)=\dot{p}(t)$, in the ECI coordinates as follows. First, the relation to convert from ECI to ECEF vectors is given as follows.

$$p_s(t) = R_3(-\Theta(t)) \times p(t)$$

$$v_s(t) =$$

$$\dot{p}_s(t) = \frac{d}{dt}(R_3(-\Theta(t)) \times p(t)) = \dot{R}_3(-\Theta(t)) \times p(t) + R_3(-\Theta(t)) \times v(t)$$

Here, the rotation matrix $R_3(\Theta(t))$ is defined as follows.

$$R_3(\Theta(t)) = \begin{bmatrix} \cos\Theta(t) & \sin\Theta(t) & 0 \\ -\sin\Theta(t) & \cos\Theta(t) & 0 \\ 0 & 0 & 1 \end{bmatrix}$$

The above equalities are used in the following algorithmic description. First, the ECEF position vector $p_s(t)$ is converted to the ECI position p(t) as follows.

$$p(t) = R_3^{-1}(-\Theta(t)) \times p_s(t) = R_3(\Theta(t)) \times p_s(t)$$

Here, it can be shown that $R_3^{-1}(-\Theta(t)) = R_3(\Theta(t))$.
The ECEF position vector $v_s(t)$ is converted to the ECI velocity v(t) as follows:

$$v(t) = R_3^{-1}(-\Theta(t)) \times (v_s(t) - \dot{R}_3(-\Theta(t)) \times p(t)) =$$
$$R_3(\Theta(t)) \times (v_s(t) - \dot{R}_3(-\Theta(t)) \times p(t))$$

The vector h(t) of the specific angular momentum is determined as the cross-product of the vectors p(t) and v(t); $h(t)=p(t)\times r(t)$. The inclination angle i as the arc-cosine of the dot product between the normalized h(t) and the K-axis unit vector $K=[0, 0, 1]^T$. Thus, $$i(t) = \cos^{-1}\left(K^T \cdot \frac{h(t)}{\|h(t)\|}\right).$$

The time rate of change of i(t) as the average value (over past measurements) of $$\dot{i}(t) = \frac{i(t) - i(t - T_s)}{T_S}.$$

The nodal vector n(t) pointing towards the ascending node is determined as the cross-product of the vectors K and h(t); $n(t)=K\times h(t)$.

The longitude of the ascending node is determined as the arc-cosine of the dot-product of the normalized vector n(t) and the I-Axis unit vector, $K=[1, 0, 0]^T$. Thus, $$\Omega(t) = \cos^{-1}\left(I^T \cdot \frac{n(t)}{\|n(t)\|}\right).$$

If $n_J(t)<0$, $\Omega(t)=2\pi-\Omega(t)$. The time rate of change of $\Omega(t)$ is calculated as the average value (over past measurements) of $$\dot{\Omega}(t) = \frac{\Omega(t) - \Omega(t - T_s)}{T_S}.$$

The argument of latitude $u(t)=\omega(t)+v(t)$ is determined as the arc-cosine of the dot-product of the normalized vector n(t) and the ECI position vector p(t). Thus, $$u(t) = \cos^{-1}\left(\frac{n(t)}{\|n(t)\|} \cdot \frac{p(t)}{\|p(t)\|}\right).$$

If $r_K(t)<0$, $u(t)=2\pi-u(t)$. The time rate of change of u(t) is calculated as the average value (over past measurements) of $$\dot{u}(t) = \frac{u(t) - u(t - T_s)}{T_S}.$$

In performing the conversion function, the semi-major axis A is calculated as $A(t)=\|p(t)\|$, the eccentricity e(t) is set to zero, and argument of perigee $\omega(t)$ is set to zero, mean anomaly M(t) is set to u(t), and reference time $t_{oe}$ is set the current time t.

Alternatively, the semi-major axis A is calculated as $$A = -\frac{\mu}{2\xi(t)}, \text{ where } \xi(t) = \frac{\|v(t)\|^2}{2} - \frac{\mu}{\|p(t)\|},$$

and $\mu=398600.4418\times10^9$ m$^3$/s$^2$. The eccentricity vector is calculated as $$e(t) = \frac{v(t) \times h(t)}{\mu} - \frac{p(t)}{\|p(t)\|},$$

where eccentricity e(t) is the magnitude of the vector e(t). The vector e(t) can be used to calculate the argument of perigee $\omega(t)$ as $$\omega(t) = \cos^{-1}\left(\frac{n(t)}{\|n(t)\|} \cdot \frac{e(t)}{\|e(t)\|}\right),$$

if $e_K(t)<0$, $\omega(t)=2\pi-\omega(t)$; the true anomaly $$v(t) = \cos^{-1}\left(\frac{e(t)}{\|e(t)\|} \cdot \frac{p(t)}{\|p(t)\|}\right),$$

if $r^T(t)v(t)<0$, $v(t)=2\pi-v(t)$; the eccentric anomaly E(t) as $$E(t) = 2 \times \tan^{-1}\left(\sqrt{\frac{1-e(t)}{1+e(t)}} \times \tan\left(\frac{v(t)}{2}\right)\right);$$

and the mean anomaly M(t) as $M(t)=E(t)-e(t)\sin E(t)$.

Code phase offset can be derived from GBCH using the values depicted Table 14. For the code phase calculation, GBCH information conveys $\Delta t_{sv}$ at $t_0$ and $a_{f1}$ as depicted in Table 14.

TABLE 14

| Parameters for Clock Correction | |
|---|---|
| Parameters | Value from GBCH |
| $T_{GD}$ | N/A |
| $t_{oc}$ | N/A |
| $a_{f2}$ | N/A |
| $a_{f1}$ | GBCH |
| $a_{f0}$ | N/A |
| $\Delta t_{sv}$ | $\Delta t_{sv}$ at evaluated at $t_0$ |

At the gateway, and where $\Delta t_r$ is the relativistic corrections term (in seconds), $\Delta t_{sv}(t_0)$ is calculated based on the following:

$$\Delta t_{sv}(t_0)=a_{f0}+a_{f1}(t_0-t_{oc})+a_{f2}(t_0-t_{oc})^2+\Delta t_r-T_{GD}$$

After receiving GBCH, at time $t_1$, UT shall evaluate the code phase correction by:

$$\Delta t_{sv}(t_1) =$$
$$a_{f0} + a_{f1}(t_0 - t_{oc}) + a_{f2}(t_0 - t_{oc})^2 + \Delta t_r - T_{GD} \cong \Delta t_{sv}(t_0) + a_{f1}(t_1 - t_0)$$

The described arrangement and processes, in certain embodiments, advantageously enable rapid acquisition of ephemeris information over standard GPS signal acquisition methods.

One of ordinary skill in the art would recognize that the processes for providing a satellite interface to support mobile communication services may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 9:
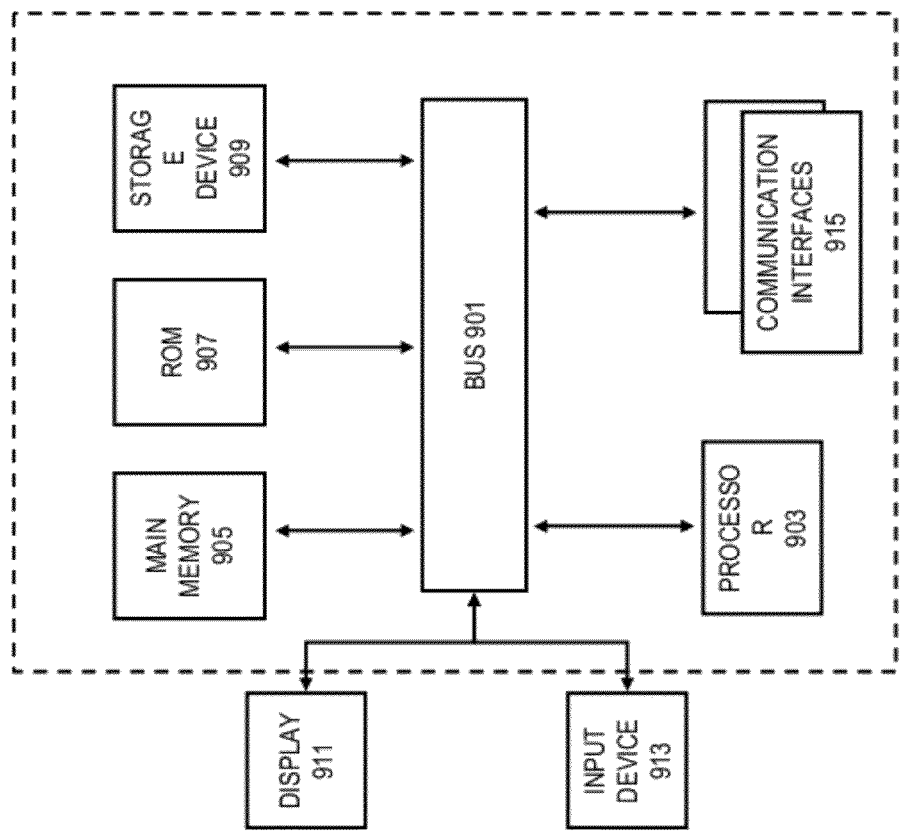
FIG. 9 is a diagram of hardware that can be used to implement certain embodiments.

FIG. 9 illustrates exemplary hardware that can be used to implement certain embodiments. A computing system 900 includes a bus 901 or other communication mechanism for communicating information and a processor 903 coupled to the bus 901 for processing information. The computing system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computing system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computing system 900 may be coupled via the bus 901 to a display 911, such as a liquid crystal display, or active matrix display, for displaying information to a user. An input device 913, such as a keyboard including alphanumeric and other keys, may be coupled to the bus 901 for communicating information and command selections to the processor 903. The input device 913 can include a cursor control, such as a mouse, a trackball, or cursor direction keys, for communicating direction information and command selections to the processor 903 and for controlling cursor movement on the display 911.

According to various embodiments of the invention, the processes described herein can be provided by the computing system 900 in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 900 also includes at least one communication interface 915 coupled to bus 901. The communication interface 915 provides a two-way data communication coupling to a network link (not shown). The communication interface 915 sends and receives electrical, electromagnetic, or optical signals that carry digital data streams representing various types of information. Further, the communication interface 915 can include peripheral interface devices, such as a Universal Serial Bus (USB) interface, a PCMCIA (Personal Computer Memory Card International Association) interface, etc.

The processor 903 may execute the transmitted code while being received and/or store the code in the storage device 909, or other non-volatile storage for later execution. In this manner, the computing system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
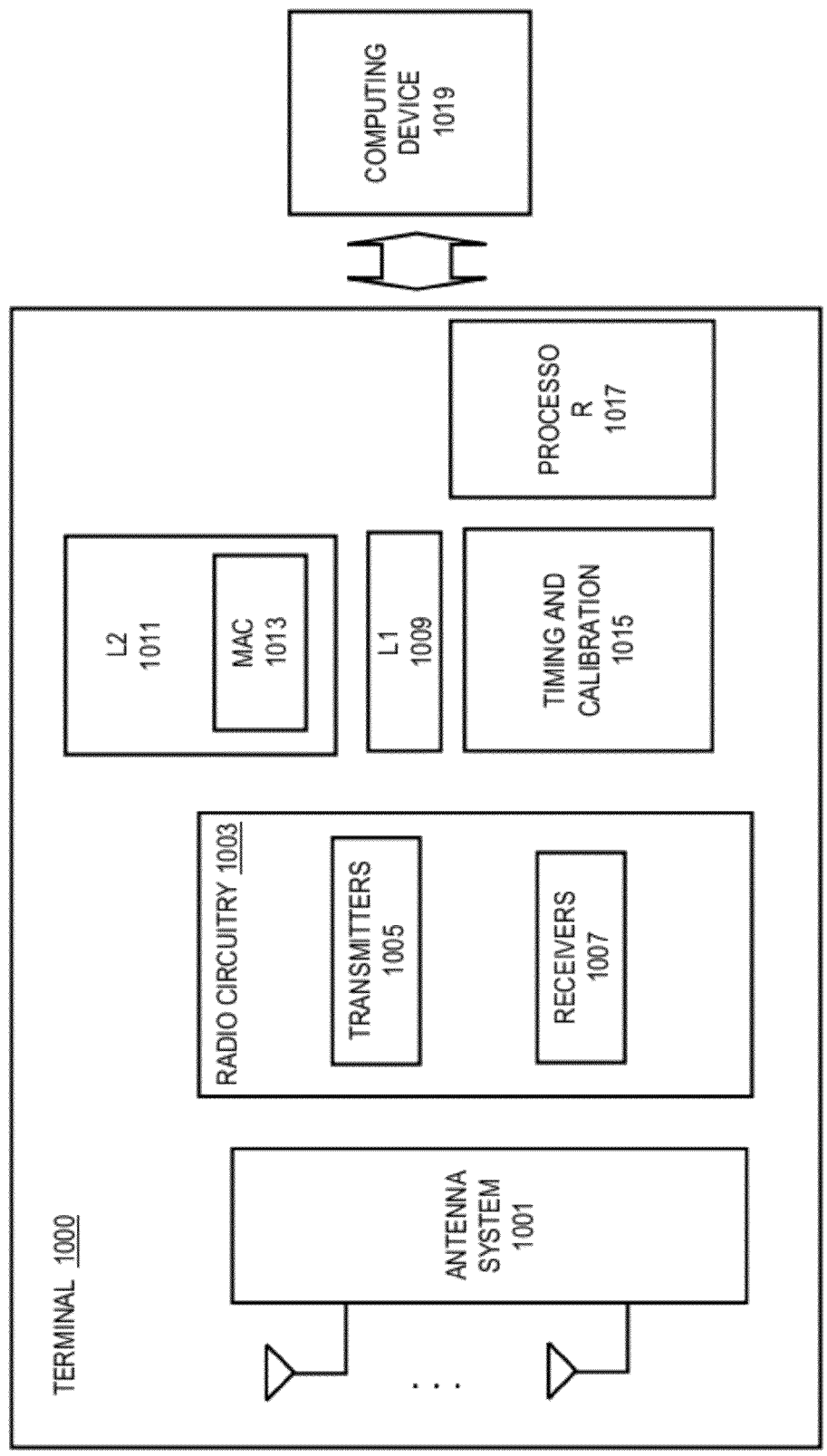
FIG. 10 is a diagram of exemplary components of a user terminal configured to operate in the system of FIG. 1 according to an exemplary embodiment.

FIG. 10 is a diagram of exemplary components of a user terminal configured to operate in the system of FIG. 1, according to an exemplary embodiment. A user terminal 1000 includes an antenna system 1001 (which can utilize multiple antennas) to receive and transmit signals. The antenna system 1001 is coupled to radio circuitry 1003, which includes multiple transmitters 1005 and receivers 1007. The radio circuitry encompasses all of the Radio Frequency (RF) circuitry as well as base-band processing circuitry. As shown, layer-1 (L1) and layer-2 (L2) processing are provided by units 1009 and 1011, respectively. Optionally, layer-3 functions can be provided (not shown). Module 1013 executes all Medium Access Control (MAC) layer functions. A timing and calibration module 1015 maintains proper timing by interfacing, for example, an external timing reference (not shown). Additionally, a processor 1017 is included, and may execute the processes of FIGS. 2A-2C. Under this scenario, the user terminal 1000 communicates with a computing device 1019, which can be a personal computer, work station, a Personal Digital Assistant (PDA), web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving, at a user terminal, positioning data from a base station, wherein the positioning data is received in a second format, wherein the second format was derived from ephemeris data broadcast via a global positioning system (GPS) in a first format, and wherein the second format results from one or more of preprocessing and compression of the first format of the positioning data, and includes satellite position data and satellite velocity data;
   converting, by the user terminal, the positioning data from the second format into a third format that is compatible with a protocol of the GPS system; and
   determining, by the user terminal, a first fix using the third format of the positioning data.

2. A method according to claim 1, wherein the satellite position data and the satellite velocity data are specified, at least in part, in Earth Centered Earth Fixed (ECEF) coordinates.

3. A method according to claim 2, wherein the first format of the positioning data includes Keplerian parameters.

4. A method according to claim 3, wherein the conversion of the positioning data from the second format into the third format comprises:
   applying a conversion algorithm to convert the ECEF coordinates for the satellite position data and the satellite velocity data into the Keplerian parameters of the first format of the positioning data.

5. A method according to claim 1, further comprising:
   outputting the third format of the positioning data to a GPS processor of the user terminal.

6. A method according to claim 1, wherein the second format of the positioning data is transmitted from the base station to the user terminal via communications links over a communications satellite.

7. An apparatus comprising:
   a receiver module configured to receive positioning data from a base station, wherein the positioning data is received in a second format, wherein the second format was derived from ephemeris data broadcast via a global positioning system (GPS) in a first format, and wherein the second format results from one or more of preprocessing and compression of the first format of the positioning data, and includes satellite position data and satellite velocity data; and
   a processor configured to convert the positioning data from the second format into a third format that is compatible with a protocol of the GPS system, and to determine a first fix using the third format of the positioning data.

8. An apparatus according to claim 7, wherein the satellite position data and the satellite velocity data are specified, at least in part, in Earth Centered Earth Fixed (ECEF) coordinates.

9. An apparatus according to claim 8, wherein the first format of the positioning data includes Keplerian parameters.

10. An apparatus according to claim 9, wherein the conversion of the positioning data from the second format into the third format comprises:
    applying a conversion algorithm to convert the ECEF coordinates for the satellite position data and the satellite velocity data into the Keplerian parameters of the first format of the positioning data.

11. An apparatus according to claim 7, wherein the processor is further configured to output the third format of the positioning data to a GPS processor of the user terminal.

12. An apparatus according to claim 7, wherein the first format of the GPS data originates from one or more GPS satellites.

13. A system comprising a base station, wherein the base station comprises:
    a receiver configured to receive positioning data from one or more global positioning system (GPS) satellites of a GPS system, wherein the positioning data is in a first format and comprises ephemeris information;
    a processor configured to convert the positioning data from the first format into a second format, wherein the second format is based on one or more of preprocessing and compression of the first format of the positioning data, and includes satellite position data and satellite velocity data; and
    a transmitter configured to transmit the positioning data in the second format to one or more user terminals.

14. A system according to claim 13, further comprising at least one user terminal, wherein the at least one user terminal comprises:
    a receiver configured to receive the positioning data from the base station, wherein the positioning data is received in the second format; and
    a processor configured to convert the positioning data from the second format into a third format that is compatible with a protocol of the GPS system, and to determine a first fix using the third format of the positioning data.

15. A system according to claim 14, wherein the satellite position data and the satellite velocity data are specified, at least in part, in Earth Centered Earth Fixed (ECEF) coordinates.

16. A system according to claim 15, wherein the first format of the positioning data includes Keplerian parameters.

17. A system according to claim 16, wherein the conversion of the positioning data from the second format into the third format comprises:
    applying a conversion algorithm to convert the ECEF coordinates for the satellite position data and the satellite velocity data into the Keplerian parameters of the first format of the positioning data.

18. A system according to claim 14, wherein the processor of the at least one user terminal is further configured to output the third format of the positioning data to a GPS processor of the user terminal.

* * * * *